F. M. CARROLL.
MULTIPLE CASH REGISTER.
APPLICATION FILED FEB. 17, 1912.
1,163,739.
Patented Dec. 14, 1915.
7 SHEETS—SHEET 5.
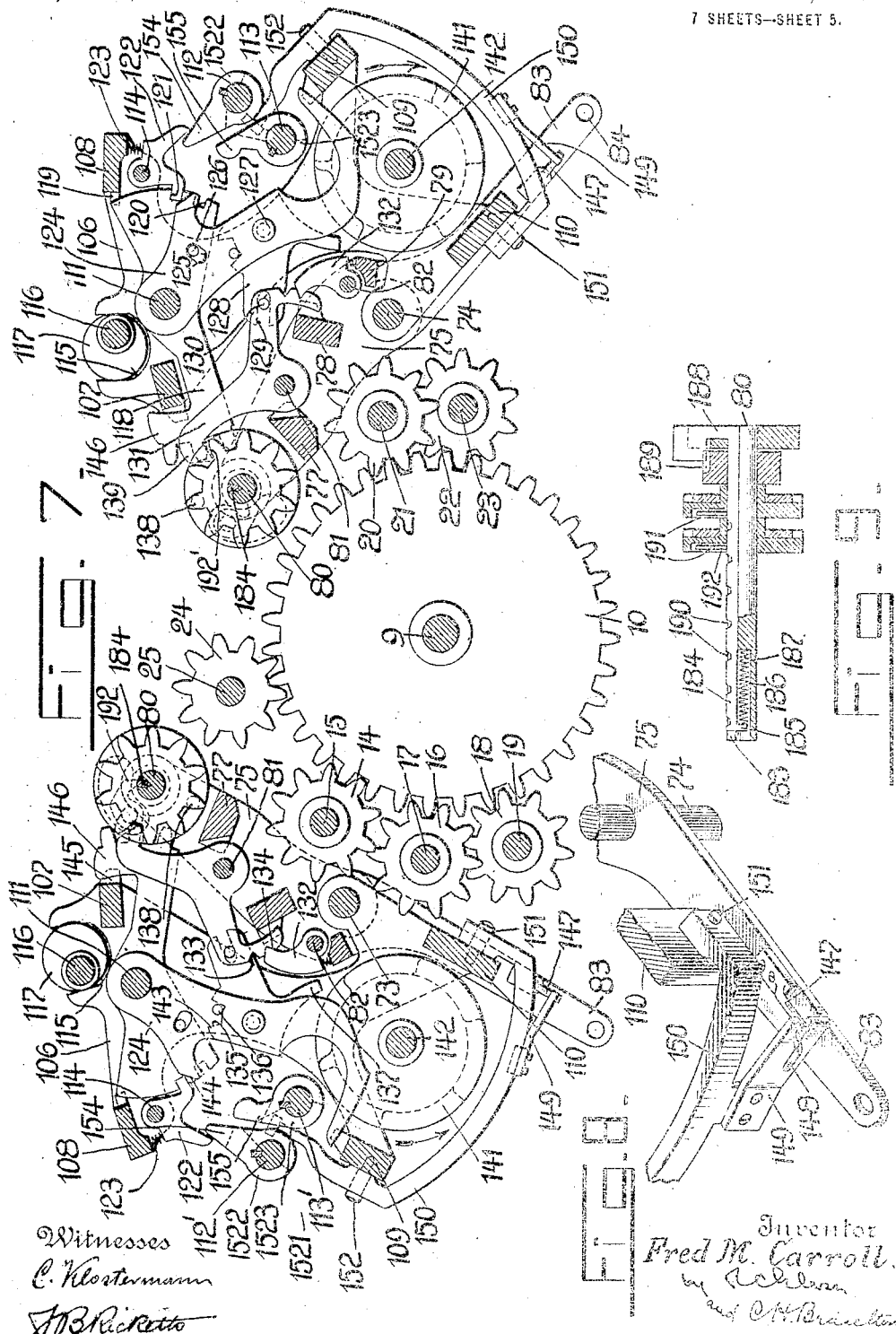

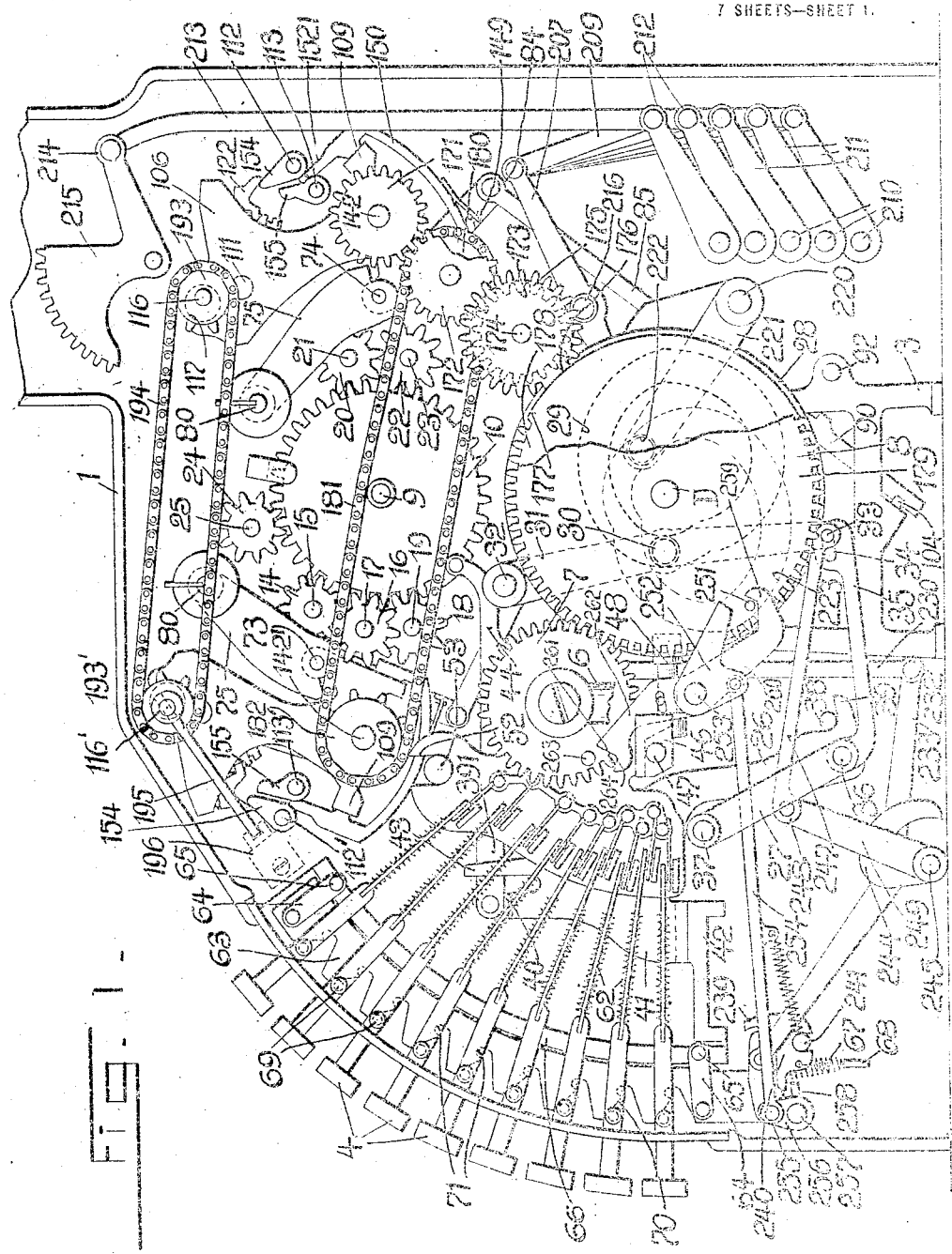

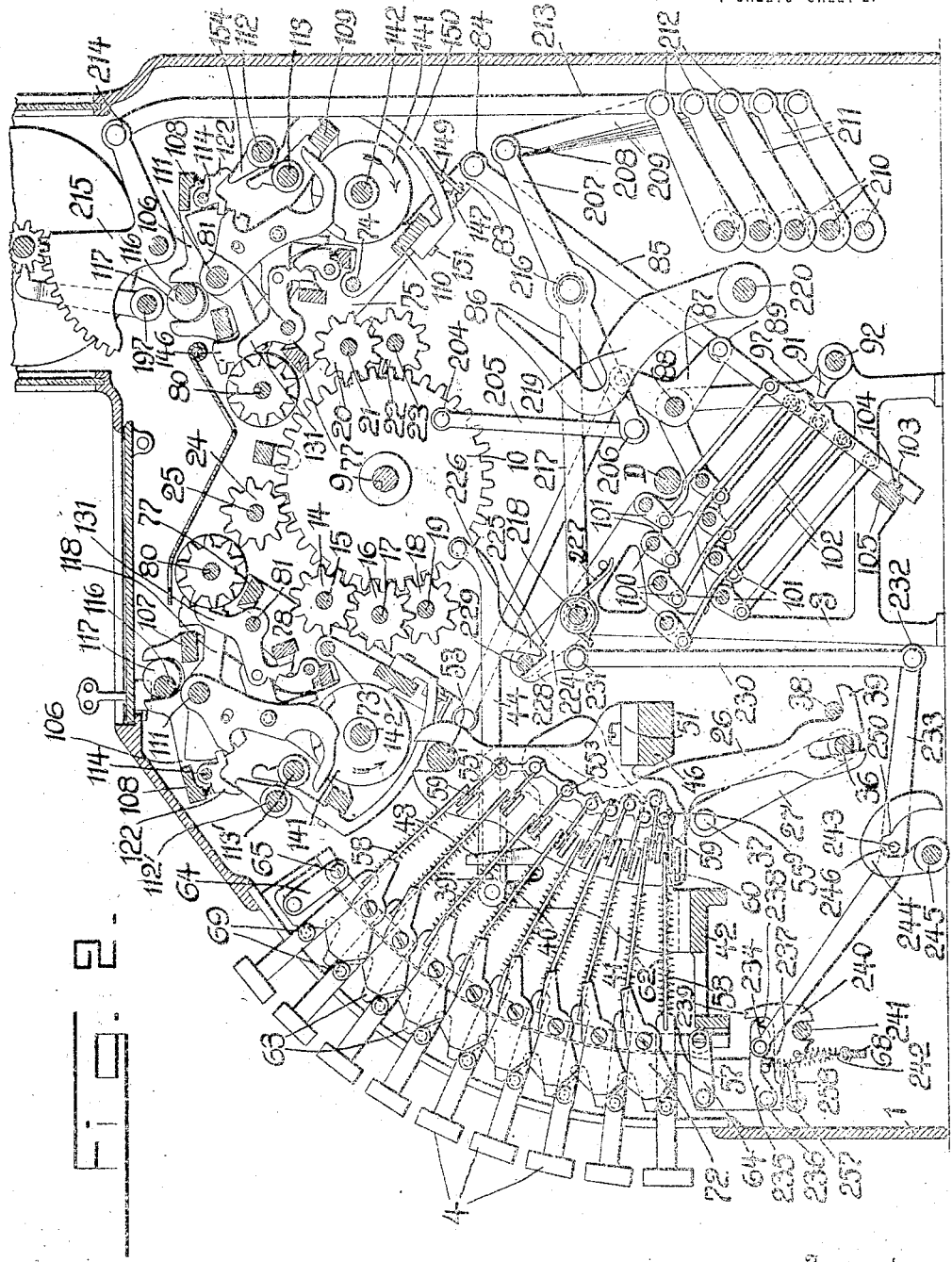

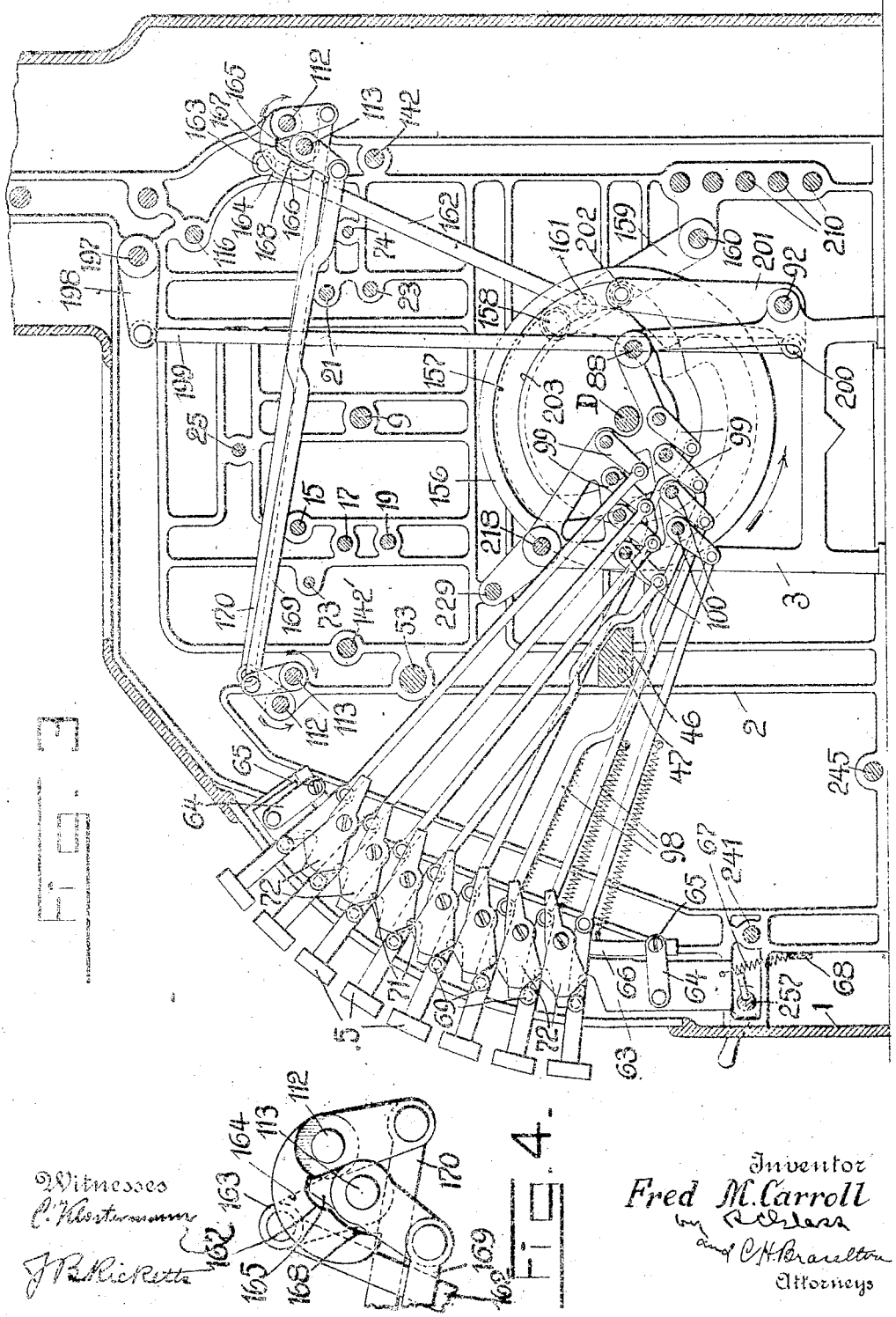

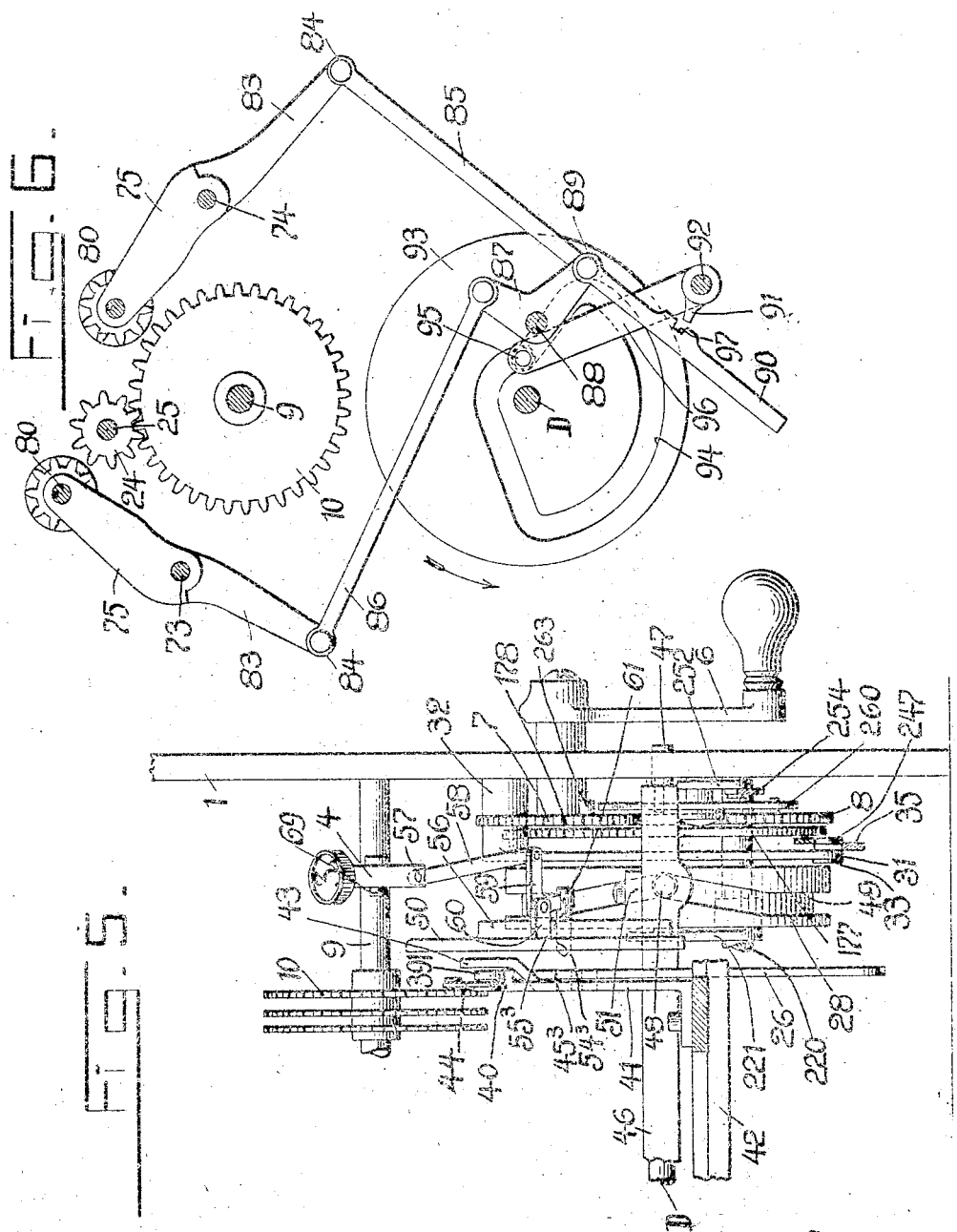

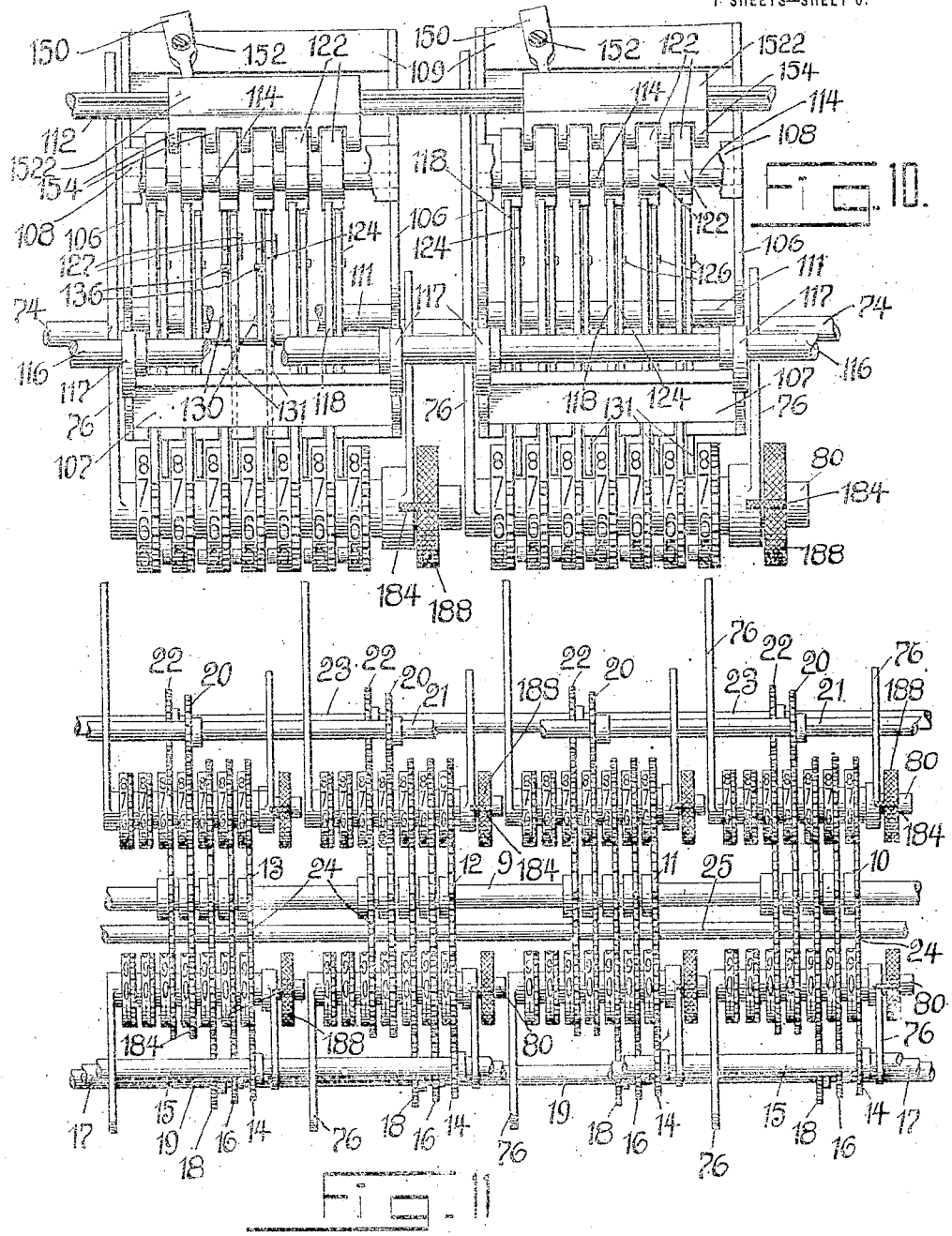

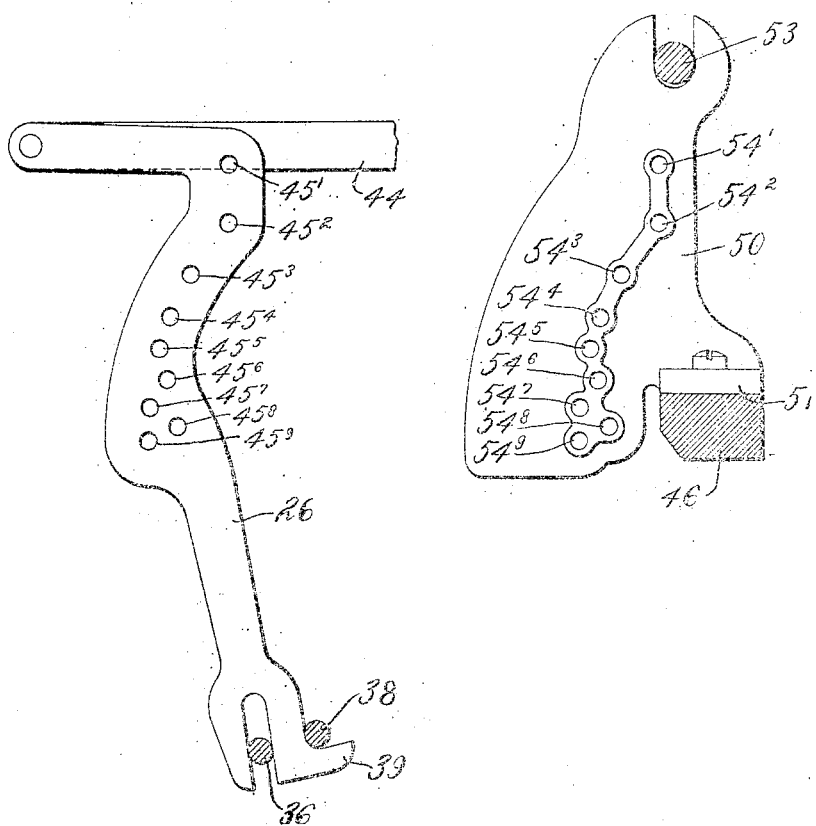

UNITED STATES PATENT OFFICE.

FRED M. CARROLL, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MULTIPLE CASH-REGISTER.

1,163,739.   Specification of Letters Patent.   Patented Dec. 14, 1915.

Application filed February 17, 1912. Serial No. 378,252.

*To all whom it may concern:*

Be it known that I, FRED M. CARROLL, a citizen of the United States, residing at Dayton, in the county of Montgomery and State of Ohio, have invented certain new and useful Improvements in Multiple Cash-Registers, of which I declare the following to be a full, clear, and exact description.

This invention relates to cash registers and particularly to that type of such machines employing a plurality of totalizers adapted to be actuated selectively whereby the amounts of the various transactions may be entered and allowed to accumulate in their proper totalizers.

To construct a machine of the above class in which the various parts as far as practical are positive in their action is one of the chief objects of this invention. Particular attention has been paid to the carrying out of this positive idea and avoiding all unnecessary use of springs, in the development of the novel differential mechanism, transfer mechanism and totalizer selecting mechanism of this invention.

Further objects of the invention are to provide simple turn to zero mechanism for the totalizer with means whereby the totalizers are disengaged from both the actuators and the transfer mechanism to permit turning to zero of the totalizers; and to provide locking mechanism for the differential mechanism controlled from the key detents and operated from the crank handle to unlock the differential mechanism.

Briefly the differential mechanism is constructed upon the principle of a lever given an invariable movement at one end at each operation of the machine, and the other end being capable of differential movement which is controlled by selective movement by the keys of a series of pins positioned longitudinally of the lever and adapted to form fulcrums for it. In the construction of this invention the pins are selected and moved transversely by the keys toward but not into operative relationship with their differential lever, further movement of the pin so as to form a fulcrum for the lever being accomplished from the crank handle of the machine by transverse movement of a frame carrying all of the pins.

The selecting and rocking of the totalizers into engagement with the actuators is effected from a series of special keys which serve positively to connect a series of sliding bars, one for each counter and key, with a shaft rotated at each operation of the machine. The sliding of the selected bar by connection with the shaft operatively engages the corresponding totalizer with the differential actuating mechanism. This sliding of the selected bar also effects lateral shifting movement of actuators for the transfer restoring mechanism to bring them into operative alinement with the restoring mechanism to actuate it to restore the transfer mechanism.

The transfer elements are tripped by the totalizer wheels after which they are positively actuated by cams on a rotary shaft. The restoring of the transferring elements to normal position after a transfer has been effected occurs at the next operation of the machine in which the same totalizer is to be used. There are as many sets of transfer and transfer restoring mechanisms as there are totalizers.

With these and incidental objects in view, the invention consists in certain novel features of construction and combinations of parts, the essential elements of which are set forth in the appended claims, and a preferred form of embodiment of which is hereinafter described with reference to the drawings which accompany and form part of the specification.

Figure 1 represents an end view of the machine with the side frame omitted, showing the driving mechanism. Fig. 2 is a transverse section through the machine looking in the direction of and showing a bank of the amount keys. Fig. 3 is a similar view showing the special bank of keys for selecting the totalizers. Fig. 4 is an enlarged detail view of the rocking members for restoring the transfer elements. Fig. 5 is a front view of the driving mechanism also showing the differential mechanism. Fig. 6 is a detail view showing the means for throwing in the selected totalizer. Fig. 7 is an enlarged transverse sectional view through the totalizers. Fig. 8 is an enlarged perspective view showing the construction for shifting the restoring pawls. Fig. 9 is an enlarged detail view of the turn to zero shaft with part in section. Fig. 10 is a top plan view of two of the rear totalizers, and Fig. 11 is a top plan view showing all the totalizers and their relationship to each other and to their actuating mechanism. Fig. 12 is a detail of one of the actuator driving levers, and shows the location of the holes to receive the fulcrum pins. Fig. 13 shows one of the movable plates carrying the fulcrum pins.

The present invention is shown and will be described as applied to cash registers of the two motion type in which the various operations are controlled from banks of keys but are effected by other driving mechanism. A showing and description of various parts of cash registers of this type, such as the printing mechanism and part of the indicating mechanism is deemed unnecessary to an understanding of the present invention and will be omitted for the sake of clearness.

1 represents the cabinet of the machine which incloses the mechanism hereinafter to be described except those parts such as the keys and the crank handle which necessarily project from the cabinet for manipulation by the operator. The frame of the machine which directly or indirectly supports the various parts is composed of two similarly designed end pieces, the left hand one of which is indicated at 2 in Fig. 3, and longitudinally extending members connecting them. These end pieces of the frame aided in some instances by the auxiliary frame 3 intermediate the end frames form supports and bearings for the shafts and other members extending longitudinally through the machine.

As stated above, the machine is of the two motion type. To operate it to enter a transaction the amount must be set up through the amount keys, a bank of which is shown in Figs. 1 and 2 as indicated by reference character 4, and one of the special keys indicated at 5 in Fig. 3 must be depressed. After the manipulation of the amount and special keys to complete the operation of the machine, the crank handle 6 must be given two revolutions which, through gear 7 rigid therewith meshing with a large gear 8 on the main drive shaft D of the machine, rotates this shaft one complete rotation.

Fig. 11 shows eight totalizers carried by as many pivotally mounted frames arranged in two rows of four each extending longitudinally of the machine. There are as many sets of actuator gears for the totalizers as there are totalizers in one totalizer row, i. e. four, and each set comprises as many actuators as there are banks of amount keys. Each set of actuators is adapted to drive an adjacent totalizer in either the front or back row of totalizers. They do not drive the front row of totalizers directly, however, but through a set of intermediate pinions always in mesh with the actuator gears and into mesh with which the forward totalizers are brought when selected for operation. The actuator gears for like denominations are connected for simultaneous rotation only one of these of like denomination being actuated directly from the differential mechanism, this one being the units actuator gear for the right pair of totalizers, the tens actuator gear for the second pair of totalizers, the hundreds for the third pair and the thousands and tens of thousands actuators for the left hand pair of totalizers, or if five totalizers in a row are desired the tens of thousands actuator of the totalizer farthest to the left will be directly connected with its differential mechanism.

Referring to Figs. 1, 2, 7 and 11, the shaft 9 loosely carries the four sets 10, 11, 12 and 13 of actuator gears. Each of the units actuator gears of these sets meshes with the corresponding one of four pinions 14 rigid with shaft 15 supported by the two end frames of the machine. The tens, hundreds, thousands and tens of thousands actuator gears similarly mesh respectively with pinions 16 on shaft 17, pinions 18 on shaft 19, pinions 20 on shaft 21 and pinions 22 on shaft 23. In this way all of the corresponding actuator gears are simultaneously rotated and to the same extent. As stated above, the front row of totalizers do not mesh directly with the actuator gears but are actuated therefrom through pinions 24 loose on shaft 25 which are always in mesh with their corresponding actuator gears and are differentially moved in accordance with the differential movement of the latter. Differential movement of the actuator gears will, by rocking either of the rear totalizers into mesh with them or either of the forward ones into mesh with the pinions 24, be communicated to the desired totalizer.

The actuator gears are given their differential movement in a positive manner. The extent of this movement is controlled by the amount keys 4 but their movement is positively effected from an operation of the crank handle. A series of levers 26, one for each bank of amount keys, are given an invariable movement at one end at each operation of the machine by a yoke 27 oscillated from the drive shaft D. The drive shaft carries a cam 28 provided on one side with a cam groove 29 in which plays a roller 30 intermediate the ends of a lever 31 pivoted at 32 to the frame of the machine and carrying at the opposite end a pin 33 working in a slot 34 in one end of link 35, the other end of which link is pivotally connected with cross bar 36 of the yoke 27. This cross bar 36 plays in notched lower ends of the differential levers 26 and in this way the latter are given an invariable oscillatory movement at this end at each operation of the machine by the cam 28, lever 31 and link 35 oscillating the yoke 27 about pivot 27 first forwardly and then back to normal position. A cross bar 88 extends longitudinally of the machine and serves to prevent undue movement of the lower ends of the differential levers 26 in a rearward direction and, through projections 39 of these levers, to prevent their upward movement and dislocation when in normal position.

The upper ends of differential levers 26 project forwardly at 391 and the front ends of these projections normally rest upon laterally bent portions 40 of brackets 41 carried by member 42 supported by the machine frame. Laterally offset upwardly projecting fingers 43, one for each bracket, serve as guides for the right side of the forward projections of the differential levers. At the extreme forward ends of the projections 391 of the differential levers they are pivotally connected to one end of link 44, the other end of which links are pivotally connected with the appropriate actuator gears. (See Figs. 2 and 12.)

To provide for differential movement of the upper ends of the levers 26 and their connected links 44 and actuator gears, these differential levers are each provided with a series of openings $45^1$ to $45^9$, nine in number, positioned different distances from a pivot connecting the links 44 with these levers and also different distances from the point of connection of the levers with the yoke 27.

A longitudinally movable bar 46 carries pins 47, Figs. 1 and 5 one at each end, which work in openings in the corresponding end frames of the machine and serve slidably to support the bar between the frames. This bar is provided near its right end with a rearwardly projecting pin 48 playing in a peripheral cam groove 49 in cam 28 above referred to. Upon rotation of the crank handle and resultant rotation of cam 28 the peripheral groove 49 in the latter, through connection with pin 48, serves to slide the bar 46 toward the left and retain it there until near the end of the operation of the machine, when the groove returns the bar to normal position. The purpose of this sliding movement of the bar 46 will clearly appear a little later.

The sliding bar 46 carries a number of plates 50 (Figs. 1, 2 and 13) bolted at their lower rear corners 51 to the bar and provided at their upper ends with notches 52 through which passes a transverse shaft 53 supported by the end frames of the machine. These plates 50 are each provided with a series of nine holes $54^1$ to $54^9$ in which are located respectively a series of nine pins $55^1$ to $55^9$, the pointed ends of which normally slightly project from the left side of the plates 50 (Fig. 5). These plates are increased in thickness adjacent the holes as shown at 56 better to support the pins. The holes $54^1$ to $54^9$ are arranged with respect to each other similarly to the arrangement of the holes $45^1$ to $45^9$ in the differential levers 26, and when the differential levers and these plates 50 are in normal position the two series of holes aline so that either of the pins $55^1$ to $55^9$ may be projected from plate 50 toward the levers 26 into a position such that subsequent movement toward the adjacent differential lever of the plate 50 carrying the pins, which is effected by movement of bar 46 through groove 49 on cam 28 on an operation of the crank handle, will position the projected pin into its alined opening in the differential lever. In this way the fulcrum for the differential lever is determined by the projection of one or another of the pins $55^1$ to $55^9$ into the corresponding one of openings $45^1$ to $45^9$ in the differential levers. After the proper pin has been projected into the corresponding opening in levers 26, the yoke 27 is actuated with the result that the upper end of levers 26 connected by links 44 to the actuator gears will be differentially moved depending upon the position of the fulcrums for the levers which position is determined by which of the pins $55^1$ to $55^9$ have been projected into their corresponding openings in the levers 26.

To provide for the selection of the pin 54 which is to serve as a fulcrum for the differential lever, the series of amount keys are used. The keys are respectively pivotally connected at 57 with one end of links 58, the other end of which are connected to one arm of a corresponding bell crank lever 59 pivoted on ears 60 of the plates 50. The other arm of the bell crank lever 59 works in a lateral notch 61 in the corresponding one of the pins $55^1$ to $55^9$. There is a corresponding bell crank lever and pin for each of the amount keys and as many on one plate 50 as there are amount keys in the corresponding bank. Depression of one of the amount keys, it will be readily seen from Fig. 5, serves to project the corresponding pin 55 from the side of plate 50, the subsequent movement of which plates by bar 46 carrying them, serves to finally force the projected pins into their corresponding openings in the levers 26. One key of any bank is, of course, all that is depressed at one time and consequently but one of the pins 54 of any one of the plates 50.

The keys 4 are normally forced outwardly by springs 62 and are held in depressed position by detent plates 63 carried by links 64 pivoted at 65 to a guide 66 supported by the machine frame. The detent is of well known construction and is normally held downwardly by springs 67, one end of which is attached to the lower end of the detent plate and the other to a fixed cross bar 68. As the keys are forced in, the left end of pins 69 thereon co-act with beveled edges 70 of the detent plates and force the latter upwardly to permit complete depression of the keys. When the keys are completely depressed the pins 69 are located in notches 71 back of the beveled edges 70 in the detent plates and the latter are caused to drop slightly by springs 67 to hold the keys depressed. To prevent the depression of more than one key in a single bank a device well known in the art is used, which need not, it is thought, be specifically described. This comprises briefly a series of plates 72 pivoted to the guide 66 above referred to, only two of which at one time may be separated sufficiently to allow the right ends of pins 69 on the keys to pass between them.

As stated above, there are shown in the drawings two rows of four totalizers each, the totalizers of the row nearest the front adapted to mesh with pinions 24, loosely carried by shaft 25 and which are differentially rotated with the differential rotation of the actuator gears, and the row of totalizers nearest the rear adapted to mesh directly with the actuator gears to receive differential movement. The number of totalizers can readily be increased if desired by merely extending the arrangement to cover more than two rows of totalizers, or to provide more totalizers in one row. The principles of this invention need not be departed from to do this, the embodiment shown being merely illustrative in this respect. Two shafts 73 and 74 are mounted in the end frames of the machine, the former loosely carries the four longitudinally alined totalizer frames 75 of the front row of totalizers and the latter similarly supports the rear row of totalizer frames (Fig. 11). These pivotally mounted frames 75 are alike in construction and but one needs to be, it is believed, specifically referred to. This is also true of the transfer mechanisms for the various totalizers and substantially true of the totalizer selecting mechanisms. In describing these parts the rear row of totalizers will be more particularly referred to, the main difference between the two rows being that the rear row is actuated directly from the actuator gears while the totalizers of the front row mesh with idle pinions 24 on shaft 25 which pinions are driven from the actuator gears. Another distinction, though not of importance, is the difference of direction in which the two rows of totalizers rock, due to their location with respect to their actuators. The rear totalizers are rocked forwardly to engage their actuators, while the front totalizers rock rearwardly for this purpose.

Each of these totalizer frames 75, referring particularly to Figs. 7 and 10, comprises side pieces 76 connected by transverse members 77, 78 and 79, totalizer shaft 80, tripping pawl shaft 81, and shaft 82 carrying the detent pawls for the same. One of the sides 76 of each of the frames 75 of the rear totalizers extends downwardly at 83 and is pivotally connected at 84 to the corresponding one of longitudinally shiftable bars 85, the upward movement of which serves to rock its respective totalizer frame about its pivot 73 or 74, as the case may be, into mesh with its actuating mechanism. The arms 83 for the forward totalizers are pivotally connected by links 86 to one arm of corresponding bell crank levers 87 mounted on shaft 88 carried by the frame of the machine, the other arms of which levers are connected at 89 with the short longitudinally shiftable bars 90. There are, of course, four of the long longitudinally shiftable bars 85 connected with the rear totalizers and the same number of shorter ones 90 connected with the front totalizers through the above connections. Shifting either of these bars upwardly then, it is clear, will rock its corresponding totalizer into mesh with its differential mechanism.

The shifting of the bars 85 and 90 upwardly is positively effected by projections 91 on shaft 92 which shaft is oscillated in a clockwise direction, as shown in Fig. 6, at each operation of the machine by a cam 93 rigid with the drive shaft D of the machine, and having in one side a cam groove 94 in which plays a roller 95 carried by an arm 96 rigid with shaft 92. The bars 85 and 90 are normally not adapted to be shifted by the projection 91 on shaft 92, but are provided with notches 97 normally opposite the projection 91, and to cause these bars to be shifted by this projection, they must be moved toward the shaft 92 so as to engage the projection 91 in the notches 97, after which oscillation of the shaft 92 will serve to shift the desired one of the bars 85 and 90 and position the corresponding totalizer in engagement with its actuating mechanism.

To selectively move the bars 85 and 90 into operative engagement with projection 91 on shaft 92, a series of special keys 5, eight in number, one for each totalizer, are provided (Fig. 3). Each of these keys is connected with one end of a link 98, the other end of which is connected to arms 99 on the corresponding one of the shafts 100 extending parallel with the rows of totalizers. Each of these shafts 100 carries an arm 101 at the proper position in its length to connect through rod 102 with the corresponding one of the bars 85 and 90. These bars are notched at 103 on their forward sides, which notches normally engage over a rib 104 on transverse member 105 carried by the machine frame. The depression of any of the keys 5 will, through the above connections, rock the corresponding shaft 100 in a counter-clockwise direction, as shown in Fig. 3, which rocking will cause the movement of its connected rod 102 (Fig.

2) and the corresponding one of bars 85 and 90 toward shaft 92 so as to disengage the rib 104 from notch 103 and to engage projection 91 on shaft 92 with the notch 97 of the moved bar. In this way the proper totalizer bar 85 or 90 may be selected to move into operative relationship with the shaft 92, the later oscillation of which shaft positively moves the selected totalizer into engagement with its actuating mechanism and positively disengages these parts near the end of the operation of the machine when the shaft 92 is rocked back to normal position. It will be seen that this mechanism is entirely positive in its action and the use of springs is completely avoided. The bars 85 and 90 are, through the rib 104 and notches 103, positively prevented from being shifted longitudinally except when these bars are in engagement through notches 97 and projection 91 with their actuating shaft 92. The shaft 92 is moved to rock the totalizers into mesh with their actuating mechanism before the yoke 27 is actuated to impart differential movement to the actuator gears and the return movement of the shaft 92 is effected before the return of yoke 27 to normal position, the adding of amounts into the totalizers being effected by the first movement of the actuator gears. Fig. 8 shows the same construction for preventing the depression of more than one special key at a time, as was described above in reference to the amount keys.

Loosely mounted on the shafts 73 and 74 between the side pieces 76 of each of the totalizer frames 75 is a frame carrying the transfer mechanism composed of side pieces 106 connected by transverse members 107, 108, 109 and 110 and also by shafts 111 and 114 (Fig. 7). The side pieces 106 of this frame are provided with recesses 115 through which passes a shaft 116 extending from one side of the machine to the other and carrying eccentric cams 117 adjacent each of the sides 106 of the frames for the transfer mechanism. There are, of course, two of these shafts carrying eccentrics, one for the forward row of totalizers and one for the rear, and their purpose will more clearly appear later.

The shaft 111 carries a series of transfer segments 118 pivoted intermediate their ends which normally, when their corresponding totalizer is out of mesh with the actuators, engage the totalizer pinions. The end of these transfer segments opposite that bearing the gear teeth which mesh with the totalizer pinions works in notches 119 in the transverse member 108, which thus serves as a guide for the transfer segments. At this end the transfer segments are also provided with a plurality of notches 120 and 121 in either of which the corresponding one of a series of pawls 122 mounted on shaft 114 is adapted to engage. The pawls 122 are normally held in one or the other of these recesses by springs 123 located between them and the transverse member 108. Also mounted upon the shaft 111 is a series of arms 124, one adjacent each transfer segment, each having a slot 125 in which plays a pin 126 on the adjacent transfer segment. Each of these arms 124 pivotally carries at 127 a plate 128 having a slot 129 in a forwardly projecting portion of it in which works a pin 130 on the tail of the corresponding one of a series of transfer tripping pawls 131 pivoted on the shaft 81 carried by the totalizer frame. Spring pressed detent pawls 132 carried by shaft 82 of said frame are adapted to coöperate with either of two notches 133 and 134 in the tails of the transfer tripping pawls and to hold them either in tripped or untripped position. The plates 128 are each provided with a notch 135 in which plays a pin 136 carried by the adjacent arm 124 and on their lower sides these plates are provided with depending projections 137. The position of these parts as shown in Fig. 7, is their normal position but in case the totalizer frame has been rocked to mesh the totalizer pinions with the actuator gears and any of them have been rotated to an extent requiring a transfer, pins 138 on the totalizer pinions moving from nine to zero will have engaged bevel surfaces 139 of the corresponding pawls 131 and have moved these pawls out of the path of these pins 138. This movement of the tripping pawls, through the pin and slot connections 129 and 130 with plates 128, swings said plates downwardly about their pivots so as to move their lower depending projections 137 into the path of their corresponding one of a series of cams 141 mounted on shaft 142 extending through the machine. Detent pawls 132 are yieldingly mounted and during this operation will be disengaged from lower notches 134 in the pawls 131 and engaged with upper notches 133, which serve to retain the pawls 131 in their tripped position. Pawls coöperating with the totalizer elements which have passed from nine to zero of course are all that are tripped in an operation of the machine. This downward swinging of plates 128 also brings the ends 143 of notches 135 against pins 136 on arms 124.

After the time for the tripping of the transfer mechanism the shaft 142 with its cams 141 arranged spirally around it, is rotated. These cams upon rotation of their shaft will engage with any depending projections 137 that have been kicked into their path by the tripping of their transfer pawls and through this engagement with the depending projections will carry such plates 128 with them and through the pivotal connections 127 of these plates with the arms 124 and through engagement of pin 136 on arms 124 with ends 143 of notches 135 in the plates move said arms upwardly around their axis 111. By pins 136 engaging against the ends 143 of notches 135 the plates 128 cannot swing farther downwardly around their pivotal connection with the arms 124 but must carry these arms with them, both moving about the shaft 111 as an axis. The first movement of the arms 124, due to the pin and slot connections 125 and 126, does not move the transfer segment 118 but by means of beveled projections 144 on the arms 124, forces pawls 122 out from engagement with notches 121 in the transfer segments, when further movement of these arms 124 in this direction will, by means of the lower ends of slots 125 in arms 124 engaging pins 126 on transfer segments 118, positively move the transfer segment to carry one to the next higher totalizer pinion with which it is in mesh. This transferring movement of the segment is in a counter-clockwise direction in the showing at the right in Fig. 7 which is the mechanism for one of the rear totalizers. Previous to the rotation of the cam shaft 142 the selected totalizer frame has been rocked by the shaft 92 to rock the totalizer out of engagement with the actuator gear and to return it to its normal position in engagement with the transfer segment. The transverse member 107 is notched at 145 so as to serve as guides for the upwardly projecting portions 146 of the transfer segments. Transverse members 77 and 78 are similarly notched to guide the tripping pawls at the front and back respectively, and member 109 similarly serves to guide the lower ends of the arms 124.

The transfer mechanism is not restored to normal position until the very beginning of the next operation of the machine in which the particular totalizer is selected for use. When a totalizer is rocked into engagement with its actuating mechanism by the upward shifting of the corresponding one of the bars 85 and 90, the depending projection 83 of the selected totalizer frame, through finger 147 working in a cam slot 148 in a plate 149 carried by a yoke 150 pivotally mounted at 151 and 152, respectively, on the transverse members 109 and 110 of the frame for the transfer mechanism, serves to rock this yoke 150 about its pivots so as to shift, through a forwardly projecting portion 1521 engaging notches in them, members 1522 and 1523 on shafts 112 and 113 respectively and respectively carrying a series of restoring arms 154 and 155 to move the arms of member 1522 into the planes of their corresponding pawls 122 and the arms of member 1523 into the planes of their corresponding arms 124 and plates 128. After this shifting movement of the members 1522 and 1523, they are slightly rotated about their axes by means of mechanism shown in Figs. 3 and 4, which rotate the arms 154 in a clockwise direction so as to kick the pawl 122 out of notch 120 in the transfer segment, and a little later rotates the arms 155 in the opposite direction to engage first the rear edges of plates 128 which, when these plates have been moved by the tripping pawls project slightly beyond the rear edge of arms 124, and move these plates about their pivots 127 to aline the rear edges of these plates with the rear edges of the arms 124 and then to engage the arms 124 and restore them with the plates 128 and trip pawls 131 and, through the pin and slot connections 125 and 126, the transfer segments to normal position. This restoring operation affects, of course, only the arms 124 and coöperating elements that have been tripped by totalizer wheels passing from "nine" to "zero" as only these arms would be in position to be engaged and moved by arms 155, the others being already in normal position. The action of these parts in restoring the transfer mechanism is very quick and the arms 155 and 154 are at once rotated back to their normal position, allowing pawls 122 to engage again in notches 121.

The shafts 113 and 112 are rotated from the drive shaft D of the machine by means of a cam 156 having in one side a cam groove 157 in which plays a roller 158 carried by an arm 159 mounted on shaft 160. This arm 159 is pivotally connected between the roller 158 and shaft 160 at 161 with a link 162, the other end of which is connected at 163 with an arm 164 rigid with shaft 113, as shown in Fig. 3. The first effect of cam groove 157 is to pull down the link 162 with the effect of rocking shaft 113 in a counter-clockwise direction in Figs. 3 and 4. Shaft 113 is provided with a projection 165 adapted to engage curved arm 166 rigid with shaft 112 so as to, upon the first part of the rotation of shaft 113, rock the shaft 112 in a clockwise direction (Figs. 3 and 4). Arm 155 carried by shaft 113 is not effective to restore the arm 124 and the transfer mechanism at the begining of its movement in a counter-clockwise direction, but only after shaft 112 has been rocked by projection 165 engaging cam portion 167 of arm 166, which projection 165 after rocking the shaft 112 the desired extent by engaging cam portion 167 of curved arm 166, plays against a dwell portion 168 on this arm not effecting any further movement of it and the shaft 112 as shaft 113 continues to rotate in this direction. As soon as the arms 124 and the transfer mechanism have been restored this operating mechanism therefor, is immediately returned to normal position. The rotation of shafts 112 and 113 at the rear of the machine is communicated respectively, through links 169 and 170, to corresponding shafts 113' and 112' near the front of the machine for the front row of totalizers, the rotation of which shafts serves to accomplish the same results, that of restoring the transfer mechanism for the front row of totalizers.

Just after the totalizers have been actuated from the actuating gears in an operation of the machine, the selected one is rocked back into mesh with the transfer mechanism and this rocking of the totalizer to normal position serves, through cam slot 148 and finger 147, to rock the yoke 150 to normal position thus sliding the members 152² and 152³ carrying arms 154 and 155 on their shafts 112 and 113 respectively to carry these arms out of the planes of their corresponding pawls 122 and arms and plates 124 and 128. The cam shaft 142 at the rear of the machine is rotated near the end of each operation of the machine through gear 171 rigid with this shaft (Fig. 1), meshing with an idle gear 172 supported from the frame of the machine, which also meshes with a gear 173 journaled on stub shaft 174 and rigid with larger gear 175 having a mutilated portion 176 adapted to coöperate with a mutilated portion 177 of gear 178 rigid with a large gear 179 carried by the drive shaft D of the machine. The drive shaft D is rotated once at each operation of the machine and serves, through the above connection, to rotate the cam shaft 142 once at each operation, the rotation of the latter taking place near the end of the operation of the machine only, by reason of the mutilated construction of gears 175 and 178. Idle gear 172 is provided on its side with a pinion 180 over which plays a chain 181 running to a pinion 182 on the forward cam shaft 142'. In this way the forward cam shaft is actuated once at each operation of the machine also.

To return the totalizers to zero each of their shafts is provided with a keyway 183 in which plays a key 184 having a projection 185 at one end working in a recess 186 between which projection and the bottom of the recess is a spring 187 serving to draw the key 184 with its projecting head portion 188 normally into a notch 189 in the adjacent side piece of the totalizer frame. The key is provided with a series of notches 190 which, when the key is in normal position with the projection on the head located in notch 189, lie at one side of pawls 191 carried by the corresponding totalizer wheels. By pulling the key 184 outwardly against the tension of the springs 187 sufficiently to withdraw the head 188 from notch 189, these notches 190 in the key will be beneath the pawls 191 of the totalizer wheels and rotation of the key and shaft when the parts are in this position will within one complete rotation, and until head 188 snaps into notch 189 at the end of this rotation, pick up the pawls of all totalizer wheels and turn them to zero position. The toes 192 of all of the pawls 191 will, within one complete rotation of the totalizer shaft, drop into notches 190 which notches will allow the toes of the pawls to engage the side of groove 183 in the totalizer shaft and after any of the pawls have become engaged with one side of the groove in the totalizer shaft the corresponding wheel will be rotated with the shaft through the remainder of the latter's movement to turn the wheel to zero position. At the end of a complete rotation of the totalizer shafts when their wheels are in zero position the head 188 of the key comes opposite the notch 189 in the totalizer frame allowing spring 187 to automatically engage the head of the key in notch 189 and to, at the same time, carry the notches 190 of the key out of alinement with their corresponding pawls 191. When the totalizer wheels reach zero position they are positively stopped by engagement with the surfaces 192' of the tripping pawls in a manner well known in the art.

In order to free the totalizer wheels from the transfer segments 118 with which they are normally in engagement so as to leave these wheels free to be rotated by the above operation to return them to zero, the eccentric shafts 116 and 116' which extend the length of the machine and coöperate with all of the totalizers of the corresponding row, are provided. By slightly rotating these shafts the frames carrying the transfer segments will be moved by means of the eccentrics 117, about the shafts 73 and 74 supporting these frames so as to carry the upper ends of these frames and their transfer segments 118 away from the totalizer wheels, at which time the above turn to zero operations may be performed. The eccentric shafts 116 and 116' carry pinions 193 and 193' over which works a chain 194. The forward eccentric shaft 116' may be manually rotated by means of an arm 195 rigid with it. The end of this arm 195 is normally locked in the position shown in the drawings by a lock 196, the unlocking of which, however, will permit the operator swinging this arm in a clockwise direction, as shown in Fig. 1, which serves to directly communicate the desired rotation to the eccentric shaft 116' and through the chain 194 to the shaft 116 to disengage all of the transfer segments from their totalizers.

Shaft 197 (Fig. 3) carries locking pawls (Fig. 2) for the indicators and is normally rotated in a counter-clockwise direction, as shown in Fig. 3, at the beginning of an operation of the machine, by means of an arm 198 rigid with the shaft and connected with one end of a link 199, the other end of which is connected at 200 to one arm of a bell crank 201, the other arm of which is provided with a roller 202 working in a cam slot 203 in the side of cam 156 opposite that in which the groove 157 is located. After the indicators have been set shaft 197 is rocked by the cam groove 203 in a clockwise direction to engage the locking pawls with the indicators and lock the latter in their moved positions.

The movement of the actuator gears serves to control the positioning of the indicators by each being pivotally connected (Fig. 2) at 204 with a link 205, the other end of which link is connected at 206 to one end of a beam 207, the other end of which is pivotally connected at 208 with a link 209 connected at its opposite end to the corresponding one of a series of arms, not shown, carried by the corresponding ones of a series of shafts 210 each provided with an arm 211 pivotally connected at 212 with one end of corresponding links 213, the other ends of which are connected at 214 with indicator segments 215. The beam 207 is provided on one side intermediate its ends with a roller 216 and is pivotally connected on its opposite side with one end of a link 217, the other end of which is pivotally supported at 218 with the auxiliary frame. This link 217 serves to prevent undue movement of the beam 207 in a rearward direction. The differential actuation of the actuator gears serves to differentially position the forward end of beam 207, and to communicate this differential positioning of the actuator gears to the indicators, a series of V cams 219 are provided rigidly carried by shaft 220. The shaft 220 is oscillated at each operation of the machine by an arm 221 (Fig. 1) having a roller 222 engaging in a cam groove 223 in the side of the cam 28 opposite that in which the cam groove 29 is located. The oscillation of shaft 220 in a clockwise direction in Figs. 1 and 2 causes the V cams to engage over the rollers 216 on beams 207 and to position these rollers to their normal or intermediate positions which at the same time positions the rear ends of these beams 207 and the indicators to which they are connected in accordance with the position of the forward ends of the beam as controlled by the differential movement of the actuator gears. The shafts 210 are also connected with printing type, not shown, which they differentially position simultaneously with the positioning of the indicators. The connections for accomplishing this function present nothing new in the art and for the sake of clearness are omitted.

The links 44 of the differential mechanism are normally prevented from operation by spring pressed pawls 224, one for each bank of keys, pivoted at 218. Projections 225, in the normal position of these parts, are adapted to engage behind depending projections 226 on the corresponding links 44. Springs 227 yieldingly retain the pawls in this locking position with the ends 228 in front of shaft 229 supported by the machine frame. This shaft 229 is also engaged at its rear when the different levers are in normal position by the depending projections 226 on the links 44 serving to prevent any undue forward movement of these links. Pawls 224 are withdrawn at an operation of the machine in which a key of their corresponding bank has been depressed, by means of links 230 pivoted at 231 to the pawls and at their other ends pivoted at 232 to one end of links 233, the other ends of which are pivotally connected at 234 to pawls 235 pivoted at 236 to corresponding key detent plate 63 and normally resting upon pins 237 also carried by said plates.

The rear end of each of the pawls 235 has a small projection 238 which, in the normal position of the machine, is located in front of an upwardly extending projection 239 of corresponding locking members 240 loosely supported by shaft 241 and normally drawn downwardly in front of this shaft by spring 242 connected with them and with the fixed bar 68. The links 233 carry pins 243 projecting into the plane of corresponding cams 244 carried by shaft 245. When a key is depressed its detent plate is raised as above described carrying with it its pawl 235 and the forward end of corresponding link 233 thereby raising pin 243 of said link into a recess 246 in corresponding cam 244. When the pawl 235 is elevated projection 238 moves from in front of upward projection 239 of its locking member 240 and allows this member to be moved about shaft 241 by spring 242 so as to draw the projection 239 under projection 238 of pawl 235. The upper end of the projection 239 in this position of the part serves as a support for the pawl 235 and retains the part in this position until a later stage in the operation of the machine. Upon further operation of the machine when the cam groove 29 moves link 31 forwardly to similarly swing the yoke 27, this movement of the link is communicated to a link 247 also pivoted to the lower end of link 31. The forward end of this link 247 is pivotally connected at 248 with an arm 249 rigid with shaft 245 carrying the cams 244. At the beginning of this movement of link 31, arm 249, shaft 245 and cam 244 are moved in a counter-clockwise direction (Figs. 1 and 2) causing cam portion 250 of this cam to engage pin 243 on link 233 and move the latter downwardly about its fulcrum 234 thus drawing the rear end of this link also downwardly and through it and link 31 to disengage pawl 224 from depending projection 226 of corresponding link 44 of the differential mechanism. This releasing of the links 44 takes place before the beginning of the differential oscillation of the yokes 27 due to the pin and slot connections between the links 230 and the links 35 of the yokes. The first movement of arms 31 is transmitted to the links 247 for this unlocking operation but not until the pin 33 reaches the end of slot 34 is this movement communicated to the link 35 for the differential mechanism. In this way the links 44 are unlocked for movement before the beginning of their differential movement which is effected from the swinging of the yoke 27. The differential links 44 are returned to normal position by the return of the yoke 27 to its normal position and simultaneously with the completion of the returning movement of the links the pawls 224 are freed from the effect of cam 244 and allowed to engage behind depending projections 226 of the links 44 and lock the latter in normal position.

At the end of the operation of the machine a pin 251 on the large gear 8 as the latter rotates in a counter-clockwise direction (Fig. 1) to its home position, engages one arm of a bell crank 252 pivoted at 253, the other arm of which is connected to one end of a link 254 connected at its other end 255 with an arm 256 carried by shaft 257 which also carries projections 258. The engagement of pin 251 with the bell crank 252 serves to rotate the shaft 257 in a counter-clockwise direction so as to engage projections 258 with the forward ends of rocking members 240 to rotate them so as to carry the upward projections 239 thereof from beneath projections 238 of the pawls 235 and also a little later to engage the lower ends of the detent plates and elevate these plates sufficiently to free the pins 69 from the notches in these plates and allow the springs for the keys to return them to normal position. As pin 251 passes by bell crank 252 springs 67 for the detent plates, after the keys have been released, draw the plates downwardly to normal position which at the same time returns the link 254 and bell crank 252 to normal position. As the detent plates are being lowered projection 239 on member 240 is held from beneath projection 238 of pawl 235 until the projection on the pawls passes in front of the projection 238 thus permitting the return of the pawl with the detent plate and incidentally the return of link 233 connected to it to normal position with pin 243 beneath the recess 246 in cam 244 making necessary the lifting of the corresponding detent plate by the depression of a key before the corresponding one of links 44 can be unlocked by its cam 244 at the next operation of the machine.

To operate the machine it is necessary to slightly rotate the crank handle 6 in a reverse direction on account of the normal locked condition of the large gear 8 on the drive shaft. The locking of this gear and shaft is accomplished at the end of each operation of the machine by pin 251 on the gear 8 as the latter rotates in a counter clockwise direction to its home position, which is shown in Fig. 1, stopping behind the projecting finger 259 on the lower end of lever 260 pivotally mounted at 253. The other end of this lever 260 projects upwardly adjacent pinion 7 rigid with the crank 6 and is provided with inclined edges 261 and 262 adapted to coöperate with a pin 263 on the gear 7. In an operation of the machine just before the completion of the operation, pin 263 on gear 7 has engaged inclined edge 262 on the upper end of lever 260 and forces the lower end of this lever with its finger 259 into the path of pin 251 on the gear 8, which pin serves by engagement with this finger to prevent more than a single rotation of gear 8 at one operation of the machine. In this way these parts are left at the completion of an operation of the machine in the position shown in Fig. 1, in which finger 259 is in the path of pin 251 and serves to prevent rotation of the gear 8. To again operate the machine, lever 260 must be moved to carry finger 259 out of the path of pin 251 on the gear 8 to permit the rotation of the latter. This is accomplished by slightly rotating the crank shaft 6 in a reverse or counter clockwise direction, which reverse movement of the crank and gear 7 carries pin 263 on this gear against the inclined edge 261 on the upper end of lever 260, forcing this end of the lever rearwardly which effects the forward movement of the lower end of this lever sufficiently to move the finger 259 out of the path of pin 251. This reverse movement of these parts is but slight, limited by the engagement of pin 263 in the bottom of notch 264 in the upper end of the lever 260, but is sufficient to free the pin 251 of the finger 259. After this reverse movement of the crank handle it may be rotated in a forward direction two complete rotations effecting one complete rotation of the gear 8 at the end of which the parts can assume their normal position as shown in Fig. 1.

To operate the machine the amount of the transaction is set up on the amount keys 4 and the proper one of the special keys 5 is depressed. The depression of the amount keys projects the corresponding pins 55 from their plates 50 and the depression of a special key positions its corresponding one of the bars 85 or 90 in operative relationship with the shaft 92. The depression of an amount key also raises the detent plate 63 of that bank and thereby the forward end of the corresponding lever 233, carrying the pin 243 of such lever into recess 246 of the corresponding unlocking cam 244.

After the keys 4 and 5 have been depressed the crank is rotated two complete rotations after slightly rotating it in the reverse direction to unlock the machine, as above described. Rotation of the crank and the drive shaft D through cam 28 and peripheral groove 49 therein shifts the bar 46 carrying the plates 50 to the left positioning the projected pins in their corresponding openings in the differential levers 26 to form fulcrums for said levers during their later oscillation. About the same time lever 31 is swung forwardly by cam 28 effecting through links 247 and arm 249, counter-clockwise movement of shaft 245 and cams 244, inclined surfaces 250 of which cams coöperate with the pins 248 on the levers 233, the forward ends of which have been raised by the depression of a key in the corresponding bank, to lower the rear ends of such levers and thereby disengage the corresponding pawls 224 from their links 44 and permit movement of the latter. At the completion of this unlocking of the differential mechanism pin 33 on arm 31 engages the forward end of slot 34 in link 35 and moves said link and its connected yoke 27 forwardly, the yoke carrying with it the lower ends of the differential levers. In this movement the differential levers swing about the pins 55 that have been projected into them and the upper ends of the levers and their connected links 44 and actuator gears are differentially moved, the extent of their movement depending upon the location of the fulcrums for the levers. Before this differential movement of the levers 26 and the actuator gears, shaft 92 by cam 93 and arm 96, has been rotated, shifting that one of the bars 85 or 90 which has been connected with it by the depression of a special key, so as to rock the corresponding totalizer into engagement with its actuator gears or pinions 24 as the case may be. The differential movement of the actuator gears will cause corresponding movement of the totalizer pinions which are then disengaged from the actuator gears, before the return movement of the latter, by shaft 92 rocking the totalizer frame back into normal position.

After the totalizer frame has been rocked to disengage its totalizer from the actuator gears the cam shaft 142 is rotated to effect in the manner described above, such transfers as will result from pawls 131 which have been tripped by the totalizer wheels. About the same time the yoke 27, differential levers 26 and actuator gears are returned to normal position by the cam 28, and also the cams 244 which thus free the locking pawls 224 to again lock the differential mechanism.

Before the actuator gears are returned to normal position the amount indicators are set up by the V cams 219 in the manner described. The movement of the shafts 210 to set up the indicators is also used to set up printing type at one or both ends of the machine as desired. After the indicators are set they are locked by the pawls on shaft 197 controlled by cam groove 157 in cam 156, which were disengaged from the indicators at the beginning of the operation of the machine by this cam.

After the differential levers have been restored to normal position peripheral groove 29 in cam 28 shifts bar 46 with plates 50 back toward the right to its normal position disengaging the pins 55 projecting from these plates from the differential levers. At the end of the operation of the machine and as gear 8 is completing one rotation pin 251 on this gear kicks the bell crank 252 thereby shifting rod 254 and rotating the key release shaft 257 to release all of the depressed keys to be restored by their springs. The restoring of the amount keys withdraws, through bell crank 59, the pins 55 projecting from the plates 50 and the restoring of the depressed special key disengages its bar 85 or 90 from the projection 91 on shaft 92.

The restoring of the transfer mechanism takes place at the beginning of the next operation of the machine in which the same totalizer is selected for use. The rocking of the totalizer into engagement with its actuator gears rocks the yoke 150 so as to shift the members 1522 and 1523 to aline them respectively with the detent pawls 122 and plates 124. These members are then oscillated by their supporting shafts to restore the transfer mechanism. The shafts 112 and 113 supporting these members extend the length of the machine and carry a set of these members for each totalizer of the row and are oscillated at each operation of the machine. The members 1522 and 1523 are normally out of the planes of the members they actuate, at which time their oscillation has no effect upon the transfer mechanism. The selection of a totalizer, however, as described above, shifts these members corresponding to the selected totalizer into the planes of the transfer mechanism of such totalizer and then subsequent oscillation is effective to restore the transfer mechanism.

To turn the totalizer wheels to zero the lock 196 is unlocked and the arm 195, Fig. 1, swung upwardly. This rotates the eccentric shafts 116 and 116' to move the frames carrying the transfer segments away from the totalizer wheels, disengaging the transfer segments 118 from their totalizer wheels and permitting turning of the latter. The totalizer shaft 90 of the totalizer to be reset is then rotated, which, in the manner described fully above, picks up the totalizer wheels and restores them to zero, their restoring movement being limited by engagement of their pins 138 with the surfaces 192' of the tripping pawls 131.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination with a differentially movable actuator, of a lever operatively connected at one end with the actuator, a movable member, a series of movable pins carried thereby, a series of keys each operatively connected with a corresponding pin on the movable member and when depressed adapted to project the corresponding pin from said member, means for shifting the movable member to bring the projected pin into operative relationship with the lever to form a fulcrum for said lever, and means for giving the end of the lever not connected with the actuator an invariable movement at each operation of the machine.

2. In a cash register having a main operating device, the combination with a differentially movable actuator, of a lever having a series of openings, operatively connected at one end with the actuator, a plate carrying a series of movable pins respectively normally alined with the openings in the lever, a series of keys, connections between each of the keys and a corresponding pin on the plate whereby depression of the key projects its corresponding pin from the plate, connections between the plate and the main operating device whereby the plate with its projected pin is moved to insert said pin in its corresponding opening in the lever, and means for giving the other end of the lever an invariable movement at each operation of the machine.

3. In a machine of the class described, the combination with a differentially movable actuator, a lever operatively connected at one end with said actuator, a laterally movable member, a series of pins carried thereby and adapted to be selectively projected therefrom, a corresponding series of keys, a series of bell cranks supported by said member one for each pin, one arm of the bell crank lever connected to its corresponding pin, a link connected respectively to its two ends with the other arm of the lever and with its corresponding key whereby depression of the key serves to project its corresponding pin from the side of the laterally movable member, a movable bar supporting the laterally movable pin carrying member, a drive shaft, a cam on the drive shaft operatively connected with the bar for moving the latter and the laterally movable member to operatively connect the projected pin with the lever, and a yoke operatively connected with the other end of the lever and movable from the drive shaft whereby an invariable movement is given to this end of the lever at each operation of the machine.

4. In a machine of the class described, the combination with differential mechanism, of a pawl adapted to retain said mechanism in normal position, a link connected at one end with the pawl and at the other with one end of a second link, a key detent adapted to be moved upwardly by depression of a key operatively connected with one end of the second link, means for retaining the key detent in elevated position when raised, a pin on the second link, and a cam operated from the drive shaft at each operation of the machine with which the pin on the second link is out of coöperative relationship when the detent plate is in normal position but in operative relationship with when elevated, effective when the link is in the last mentioned position to engage the pin and move the second link about its pivotal connection with the key detent to move the first mentioned link and its connected pawl to free the differential mechanism.

5. In a machine of the class described, the combination with actuating mechanism, of a plurality of totalizer carrying frames adapted to be selectively rocked to bring either of the totalizers into operative relationship with the actuating mechanism, a series of bars respectively connected with the various totalizer frames, means normally preventing longitudinal shifting of these bars, an actuating shaft adapted to be connected with the bars for shifting the latter, a series of keys, and connections between each of the keys and its respective bar for freeing the latter for longitudinal movement and operatively connecting it with the actuating shaft whereby the bar may be shifted longitudinally to position its connected totalizer with the actuating mechanism.

6. In a machine of the class described, the combination with a totalizer, of transfer segments therefor, a series of transfer cams and pawls positively connected to the transfer segments adapted when tripped by the totalizer elements to project into the path of said cams, and means for operating the cams to drive the transfer segments.

7. In a machine of the class described, the combination with a transfer segment, of a locking detent adapted to hold the segment in either of two positions, an arm operatively connected with the transfer segment, a plurality of oscillating arms respectively normally out of the planes of the locking detent and arm, a plurality of totalizers, means for selecting a totalizer for operation, and means controlled by the selection of the totalizer for operation for shifting the oscillating arms into the planes of the locking detent and arm so that the subsequent oscillation of the oscillating arms will first release the locking detent by the operation of one of the arms and later by the other move the arm connected with the transfer segment to restore the latter to normal position.

8. In a machine of the class described, the combination with a totalizer, actuating mechanism therefor, adapted to be engaged with and disengaged from the totalizer, transfer segments adapted to engage the totalizer wheels when they are disengaged from the actuating mechanism, turn to zero mechanism for the totalizer wheels, and means for moving the transfer segments to disengage them from the totalizer wheels when the latter are disengaged from the actuating mechanism to permit operation of the turn to zero mechanism.

9. In a machine of the class described, the combination with a totalizer, of actuating mechanism therefor including a differentially movable lever, a series of fulcrums for the lever, manipulative means for selecting the fulcrum to be used, means for moving the selected fulcrum into coöperative relationship with the lever, and means for oscillating the lever.

10. In a machine of the class described, the combination with differential mechanism, of a series of keys therefor, a pawl for locking the differential mechanism in normal position, a lever connected at one end with the pawl, a key detent plate connected with the other end of the lever and adapted to be raised by the depression of a key, and a cam intermediate the ends of the lever normally out of operative relationship with it but adapted to actuate it to disengage the pawl from the differential mechanism when the detent plate is raised by the depression of a key.

11. In a machine of the class described, the combination with differential mechanism, of a plurality of totalizers, a plurality of keys therefor, an actuating shaft, and a plurality of connections from the totalizers normally disengaged from the actuating shaft but adapted to be selectively engaged therewith by the depression of a key to operatively connect its corresponding totalizer with the actuating shaft whereby oscillation of the latter engages and disengages the totalizer with the differential mechanism.

12. In a machine of the class described, the combination with actuating mechanism, of a plurality of totalizers adapted to be selectively actuated thereby, transfer mechanism for each totalizer, means for actuating the transfer mechanism of the selected totalizer controlled from said totalizer, and means operated at each operation of the machine for restoring the operated transfer mechanism, rendered effective by the subsequent selection of said totalizer at a later operation of the machine.

13. In a machine of the class described, the combination with a plurality of totalizers, of transfer segments for said totalizers normally locking the latter against rotation, and means for simultaneously moving the transfer segments to unlock all of the totalizers for turn to zero operations.

14. In a machine of the class described, the combination of a differentially movable actuator, a lever operatively connected at one end with the actuator, operating means adapted to give the other end of the lever a constant movement, a plurality of fulcrums for the lever, means for selecting the fulcrum to be used, and means for moving the selected fulcrum into coöperative relationship with the lever.

15. In a machine of the class described, the combination of a differentially movable actuator, a lever operatively connected at one end with the actuator, a member operatively connected with the other end of the lever adapted to give said end an invariable movement at all operations of the machine, a plurality of fulcrums for the lever arranged at varying distances from its ends and normally out of operative relationship with said lever, manipulative means for selecting the fulcrum to be brought into operative relationship with said lever, and means for bringing the selected fulcrum into coöperative relationship with the lever.

16. In a machine of the class described, the combination of actuating mechanism, a plurality of totalizers, totalizer carrying arms adapted to be selectively rocked to bring any of the totalizers into operative relationship with the actuating mechanism, a series of bars respectively connected with the various totalizer frames, an actuating shaft which the various bars are normally disconnected from but adapted to be connected with the bars for shifting the latter, and manipulative means for selecting the totalizer to be actuated by moving its respective bar to operatively connect it with the actuating shaft to be shifted longitudinally by the latter to position its connected totalizer in operative relationship with the actuating mechanism.

17. In a machine of the class described, the combination of a plurality of totalizers, actuating mechanism therefor, transfer mechanism for each totalizer, means for selecting the totalizer to be operated, and mechanism for restoring the operated transfer mechanism to normal position effective for such purpose only when the totalizer corresponding to the operated transfer mechanism is again selected for operation at a succeeding operation of the machine.

18. In a machine of the class described, the combination of an actuator, driving means therefor permanently connected with the actuator; manipulative means for controlling the extent of movement of the actuator, locking means for the actuator tending to hold the latter in normal position, and means for unlocking the locking means rendered effective by the manipulation of the manipulative means.

19. In a machine of the class described, the combination of an actuator adapted to be given differential movement, a driving member for the actuator permanently connected with the latter, a series of keys for controlling the extent of movement of the actuator imparted by the driving member, locking means for the actuator for holding it in normal position, and means for unlocking the locking means rendered effective by the depression of a key.

20. In a machine of the class described, the combination of an oscillating actuator, a transfer segment, a totalizer pinion normally in engagement with the transfer segment but adapted to be engaged with the actuator and disengaged from the transfer segment, devices for turning the totalizer pinion to zero when disengaged from the actuator, and means for moving the transfer segment to free the totalizer pinion and permit its being turned to zero.

21. In a machine of the class described, the combination of a set of actuators, a set of transfer segments, a set of totalizer pinions normally disengaged from the actuators and in engagement with the transfer segments to be held thereby against movement in either direction, means for disengaging the totalizer pinions from the transfer segments and engaging them with the actuators for actuation by the latter, turn to zero devices for the totalizer pinions, and mechanism for moving the transfer segments out of engagement with the totalizer pinions to permit turn to zero operations of the latter.

22. In a machine of the class described, the combination with a differentially movable actuator, a lever operatively connected at one end with the actuator, operating means adapted to give the other end of the lever a constant movement, a plurality of fulcrums for the lever, means for selecting the fulcrum to be used, and means for establishing coöperative relationship between the selected fulcrum and the lever.

23. In a machine of the class described, the combination with a differentially movable actuator, of an operating means therefor comprising a lever, means for giving one end of said lever an invariable movement at all operations of the machine, a plurality of fulcrums for the lever, manipulative means for selecting the fulcrum to be effective, and means for establishing effective relationship between the selected fulcrum and the aforesaid lever.

24. In a machine of the class described, the combination with a plurality of totalizers, actuating mechanism therefor, transfer mechanism for each totalizer, means for selectively engaging the totalizers with the actuating mechanism, means for restoring the operated transfer mechanism, said means being normally out of coöperative relationship with the transfer mechanism, and means whereby the engagement of a totalizer with the actuating mechanism will establish coöperative relationship between the transfer mechanism and the restoring means.

25. In a machine of the class described, the combination with a plurality of actuators, of a lock for each actuator, a driving mechanism, a series of keys for each actuator, and means requiring the operation of a key in the corresponding series and an operation of the driving mechanism to disable the lock for an actuator.

26. In a machine of the class described, the combination with a plurality of differentially operable actuators, of a driving mechanism, manipulative devices for controlling the extent of movement of the actuators, a lock for each actuator, said locks tending to hold the actuators in their normal positions, and means controlled by the manipulative devices for predetermining the actuator locks to be unlocked by subsequent operation of the driving mechanism.

27. In a machine of the class described, the combination with a plurality of actuators, of a locking means for holding the actuators in their normal positions, a driving mechanism, a plurality of keys, and means requiring the operation of a key and an actuation of the driving mechanism to disable the aforesaid locking means.

In testimony whereof I affix my signature in the presence of two witnesses.

FRED M. CARROLL.

Witnesses:
 E. C. GLASS.
 CARL W. DRUST.